United States Patent [19]
Lindquist et al.

[11] 3,765,142
[45] Oct. 16, 1973

[54] METHOD AND APPARATUS FOR ASEPTICALLY FILLING DRUMS
[75] Inventors: Steven M. Lindquist, Pittsburgh; Kenneth A. Baker, McKeesport; Elmer E. Harris, Glenshaw; Kenneth W. Wineberg, Pittsburgh, all of Pa.
[73] Assignee: J. H. Heinz Company, Pittsburgh, Pa.
[22] Filed: Aug. 24, 1972
[21] Appl. No.: 283,353

[52] U.S. Cl.................. 53/11, 53/88, 53/112 R, 141/91
[51] Int. Cl................. B65b 31/06, B65b 55/10
[58] Field of Search................. 53/7, 11, 88, 112 R, 53/22 R; 141/89, 91, 92, 63; 99/356

[56] References Cited
UNITED STATES PATENTS
3,336,720  8/1967  Henisch .................. 53/112 R X
3,541,755  11/1970  Bobrakov et al. ......... 53/112 R X Primary Examiner—Travis S. McGehee
Attorney—Walter G. Sutcliff

[57] ABSTRACT

A method and apparatus for aseptically filling drums with flowable liquids such as fruit or vegetable juices. A steam atmosphere is provided within the drum and within a filling head engaged wth the drum top, and a condensate removal lance and filling lance are mounted on the filling head and movable into and out of the drum with a diaphragm seal means also movable into sealing engagement in the drum opening about the filling lance which extends through the drum opening during the filling operation. The seal means minimizes the condensation of steam from the filling head within the drum during the filling operation and permits maintenance of an above atmospheric pressure steam atmosphere in the filling head at all times.

20 Claims, 4 Drawing Figures

METHOD AND APPARATUS FOR ASEPTICALLY FILLING DRUMS

BACKGROUND OF THE INVENTION

This invention relates to the preservation of perishable flowable liquids and semi-liquids in drums which are used for transportation and storage. It is the practice in the food industry in preparing fruit and vegetable juices such as tomato juice, to aseptically fill the flowable liquid into large drums for storage and transportation. The flowable liquid can thereafter be used in the instance of vegetable juices in the production of soups and other food products or can be repackaged into retail size containers. The maintenance of aseptic conditions is of course essential during the filling and transporting stages in handling such perishable food products.

A method and apparatus for effecting such aseptic filling of flowable liquids is taught in U.S. Pat. No. 3,385,022 issued May 28, 1968, and owned by the assignee of the present invention. This earlier patent teaches the use of a filling head which is engageable with the top of a large shipping drum which has a filling opening in the top portion thereof. Sterilizing steam is introduced through the filling head into the drum and the space between the top of the drum and the filling head. A condensate removal lance is extendible into the drum to permit withdrawal of condensate from the bottom of the drum. The condensate removal lance is removed from the drum and the filling lance is extended therein with the flowable liquid thereby being introduced into the drum. While this method and apparatus has proved effective it has certain disadvantages. During the filling operation the relatively cool flowable liquid will cause condensation of steam remaining in the drum, and since it is desirable to maintain steam within the space between the top of the drum and the filling head at above atmospheric pressure, the continuously inflowing steam entering through the filling head will be drawn through the drum opening and further condensed within the drum. The condensation of steam from the space between the filling head and the top of the drum is objectionable in that it introduces dilutant water into the flowable liquid product and also makes it difficult to maintain an above atmospheric pressure steam atmosphere in the space between the top of the drum and the filling head to prevent the inflow of airborn organisms from the outer environment. The apparatus of the earlier invention also required a manual operation to effect placement of a closure cap in the drum opening.

SUMMARY OF THE INVENTION

An improved method and apparatus for aseptically filling a drum with a flowable liquid is detailed. A storage drum with a filling opening in the top thereof is engagable with a filling head through which sterilizing steam can be introduced to fill the drum and the space between the drum and the filling head to establish a sterilizing steam atmosphere above atmospheric pressure therein. Condensed steam is withdrawn from the drum during the sterilizing operation and thereafter a filling lance is extended through the opening in the drum to permit introduction of the flowable liquid into the drum. A diaphragm seal means is disposed about the filling lance within the drum opening to restrict passage of steam from the space between the drum and the filling head to within the drum during filling of the drum with the flowable liquid. This provision minimizes the condensation of steam within the drum and permits maintenance of a steam atmosphere which is above atmospheric pressure in the space between the filling head and the drum at all times.

A particularly advantageous structural arrangement for the filling head is also detailed. The filling head is engagable with the top of the drum when the filling head and the drum are axially aligned along their vertical central axes. A condensate removal lance is mounted through the filling head and is directed toward the filling opening in the drum top. The condensate removal lance is longitudinally movable along the direction of extension of the lance from a retracted position proximate the top of the filling head to an operative position within the drum proximate the drum bottom. A filling lance support cylinder is also mounted through the filling head and supports a flowable product filling lance which is directed toward the filling opening in the drum top. The filling lance is longitudinally movable along the direction of extension of the filling lance and is moved into position within the drum after the condensate removal lance is retracted. The filling lance is retractable into position within the lance cylinder. A capping means is also mounted within the filling head for supporting a closure cap in the sterilizing steam atmosphere. The capping means is longitudinally movable after retraction of the condensate lance and the filling lance, from a retracted position proximate the top of the filling head to a capping position with the closure cap fitted within the opening at the top of the drum. The capping means includes means for forceably sealing the closure cap in the drum opening.

DESCRIPTION OF THE PREFERRED EMBODIMENT

Figure 1:
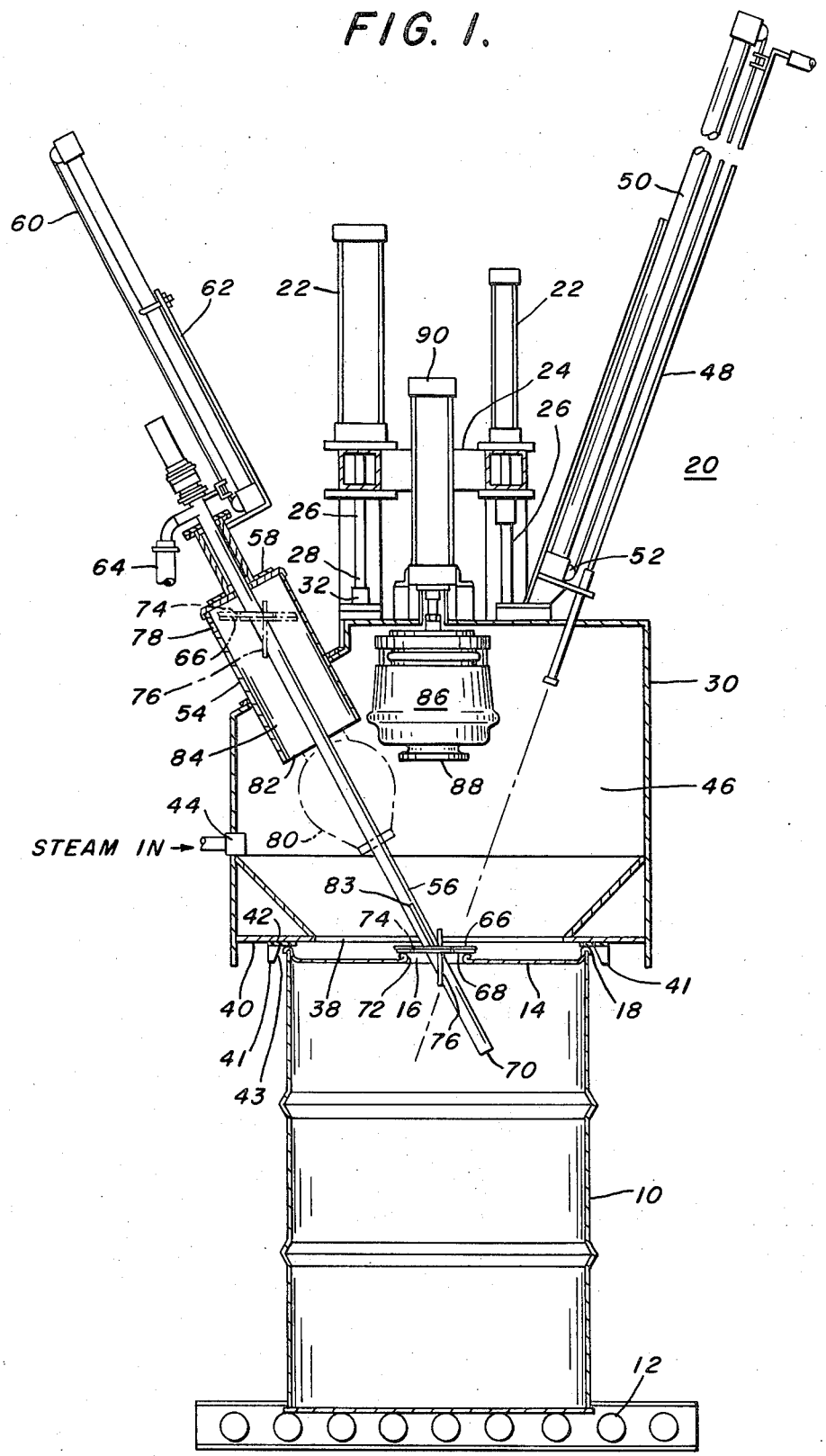
FIG. 1 is a side elevational view of an embodiment of the present invention.
Figure 2:
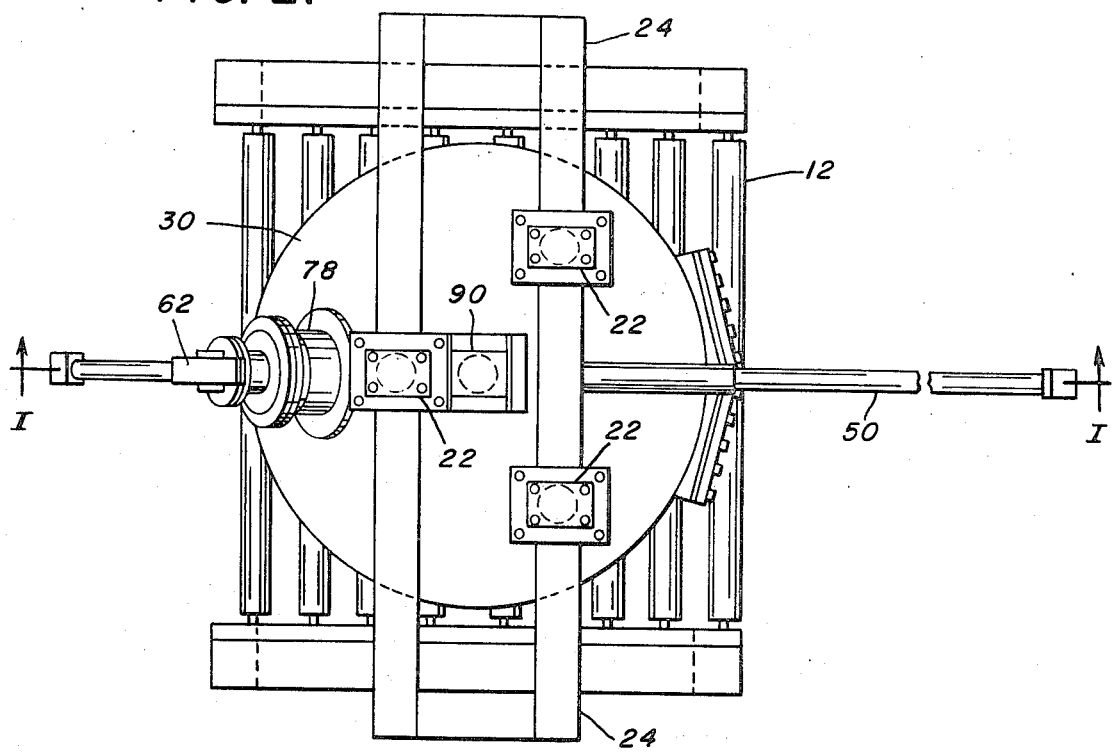
FIG. 2 is a plan view of the embodiment seen in FIG. 1.
Figure 3:
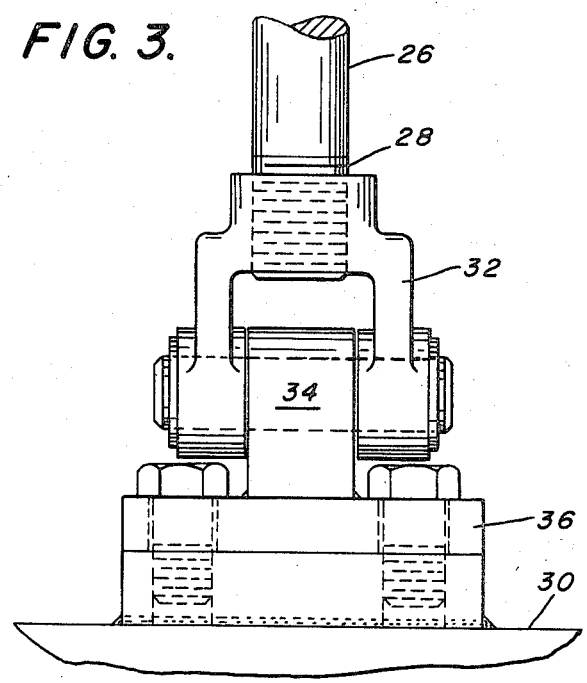
FIG. 3 is an enlarged view of the pivotal connection between the lifting means and the filling hand structure.

The invention can be best understood by reference to the exemplary embodiments shown in the figures. In FIG. 1 a large storage and transportation drum 10, which is by way of example a 50 gallon size drum, is movable into filling position on a conveyor means 12 shown generally. The drum 10 includes a top surface 14 having a filling opening 16 therein and a top rim portion 18. The filling apparatus 20 is supported from stationary frame structure 24, and the entire filling structure 20 is vertically movable downwardly into engagement with the axially aligned drum 10. In the filling position the central vertical axis of the drum and the filling head are aligned. A plurality of hydraulic cylinders 22, here three, are supported from stationary frame structure 24. The rods 26 of the hydraulic cylinders 22 extend downwardly, and the terminating ends 28 are connected to the generally cylindrical filling head 30. This connection is shown in greater detail in FIG. 3, wherein it is seen that the terminating ends 28 are connected to clevis 32, which is pivotally connected via rod 34 to mounting fixture 36 attached to the filling head 30. Thus, when the hydraulic cylinders are actuated to lower the filling head 30 into engagement with the drum top the filling head 30 is not rigidly supported but has some manuverability as a result of the pivotal connection to the lowering and lifting rods 26.

The filling apparatus 20 comprises the generally hollow generally cylindrical filling head 20 which has an open bottom portion 38. The opening 38 in the bottom of filling head 30 is surrounded by flange portions 40 which has a sealing gasket 42 mounted thereon in position to engage the top rim 18 of drum 10 when the filling head is lowered into position.

An arcuate guide flange 41 extends from the bottom of flange 40, and acts to guide or center the drum relative to the filling head 30 as the filling head is lowered into engagement with the drum top. The guide flange 41 has an inwardly sloping wall surface 43 which is engaged by the drum rim 18, and the rim is guided into sealing engagement with the gasket 42. The guide flange 41 and the pivotal connecting of the filling head 30 to its support structure permits final self-alignment of the drum and the filling head without any chance of toppling the drum.

A steam inlet 44 is provided through the wall of filling head 30 to permit introduction of sterilizing steam into the filling head chamber 46 defined between the filling head 30 and the drum top 14. The sterilizing steam passes through drum filling opening 16 into drum 10 to effect sterilization of the interior surface of drum 10.

A condensate removal lance 48 is sealingly mounted from, and extends through the top portion of filling head 30. The condensate removal lance 48 is mounted and supported from support pole 50 which is mounted on the exterior of the filling head 30. The condensate removal lance 48 is connected by a pulley drive means 52 associated with support pole 50 to permit longitudinal extension and retraction of the condensate lance 48. The condensate lance 48 is disposed at a predetermined angle relative to the vertical longitudinal axis of the filling head and the aligned drum. The condensate lance is disposed at such angle so that upon longitudinal extension of the condensate lance toward the drum the lance will pass through the drum opening 16 to extend proximate the bottom corner portion of the drum.

The sterilizing steam is continuously introduced into the filling head and the drum, and a portion of the steam condenses in the bottom of the drum. The condensate removal lance 48 is operatively connected to suction means, not shown, which permits the condensed water to be drawn out of the drum through the lance 48. When the drum has been thoroughly sterilized the condensate removal lance is retracted to a position proximate the top portion of the filling head 30 as seen in FIG. 1.

A filling lance support cylinder 54 is sealingly mounted in the top wall portion of the filling head 30. A flowable liquid filling lance 56 is movably mounted through closed wall portion 58 of cylinder 54. The filling lance 56 is operatively connected to extension and retraction drive pulley means 60 which is supported on support pole 62 mounted on the external top wall portion of the filling head 30. The filling lance 56 is connected to flowable inlet tubing 64 which runs to a processing supply, not shown, from which the flowable liquid is transported for filling of the drum. A seal plate means 66 is mounted about the filling lance 56 in a plane which is generally parallel to the top portion 14 of the drum 10. A sealing gasket 68 is attached on the underside of seal plate means 66. The filling lance 56 is disposed at a predetermined angle with respect to the vertical longitudinal axis of the filling head 30 and the drum 10 so that upon extension of the filling lance 56 downwardly the lance 56 will pass through the drum filling opening 16 so that the bottom end portion 70 of the lance 56 extends within the drum 10. The seal plate means 66 is positioned along the lance 56 so that when the filling lance 56 is in the fully extended position within the drum 10 the plate 66 and sealing gasket 68 sealingly engage the drum filling opening rim 72 about the drum filling opening 16. A plurality of small apertures 74 extend through seal plate 66 and gasket 68 for a purpose which will be explained hereafter. A conductivity probe 76 is mounted from seal plate 66 and extends downwardly therefrom a sufficient distance to be able to sense the liquid when the drum is approximately full, as an indication that the filling operation is to be terminated and the filling lance retracted. An insulated and waterproof electrical cable, not shown, extends from the conductivity probe and is brought out of the filling head 30 and connected to a control panel.

After sterilization of the interior of the drum and removal of the condensate lance, the filling lance 56 is extended into position within the drum 10 and the flowable liquid which is relatively cool is introduced into the drum. The terminal end 70 of the lance 56 is disposed proximate the side wall of the drum 10 so that the inflowing fluid will run down the interior side wall of the drum 10 to minimize condensation of the steam which is within drum 10. The seal plate means 66 prevents condensation of the steam within the filling head chamber 46 while the flowable liquid is being introduced into the drum 10. The steam already in durm 10 will be condensed but this amount is minimal so as not to affect the stored product. A continuous stream of steam is introduced through steam inlet 44 of filling head 30 to maintain the filling head chamber 46 at above atmospheric pressure. This insures that there can be no inflow of airborn contaminates during the filling procedure. If there is any leakage at all it is an outleakage of steam from the filling head 30. The seal plate means 66 as already explained has a plurality of small apertures 74 therethrough so that there is not a perfect seal between filling head chamber 46 and the interior of the drum. The apertures are small enough to substantially restrict the inflow of steam from the filling head chamber 46 into the drum during the filling operation. The apertures 74 do permit some steam to flow into the drum since the filling of the cool product into the warm drum will draw some steam from the filling head into the drum. As the filling operation nears completion, the apertures 74 also permit displacement of air from the drum 10 as the liquid nears the top of the drum.

When the drum is filled or substantially filled with the liquid as indicated by the conductivity probe 76 the filling lance 56 is withdrawn and retracted into the support cylinder 54. A substantial portion of the filling nozzle 56 actually passes outside the filling head 30 in a retracted position and only the end portion 70 extending beyond the seal plate means 66 is disposed within the support cylinder 54. A plurality of auxiliary steam inlets 78 are provided through cylinder 54 to permit maintenance of sterilizing steam inflow about this terminal end portion 70 of the filling lance 56. Preferably three symmetrically spaced stream inlets 78 provide encompassing jets of steam to bathe the filling lance 56 when it is being lowered back into filling position within the filling head 30.

Figure 4:
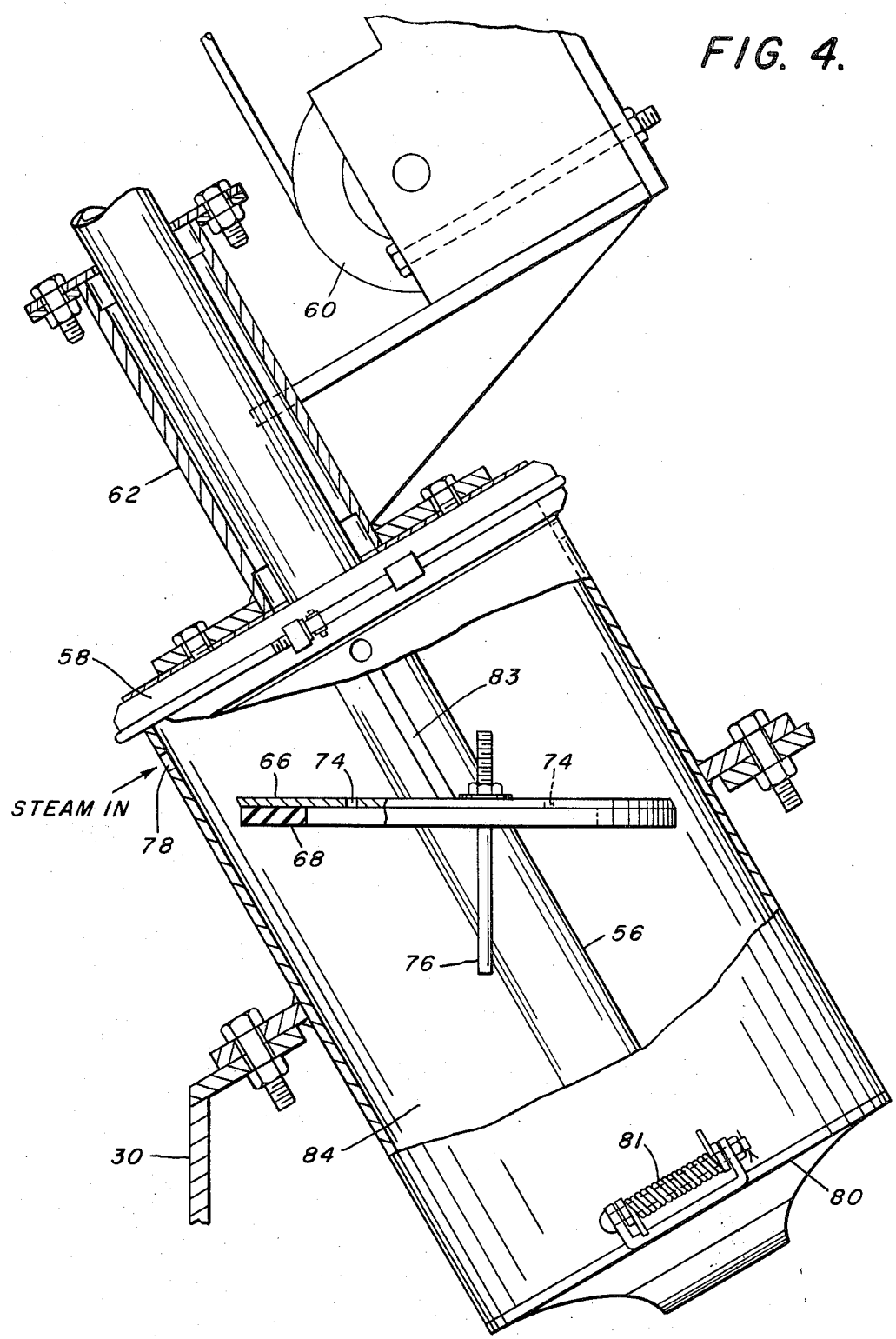
FIG. 4 is an enlarged view partly in section of the filling lance cylinder support structure.

A flapper door 80 is pivotally mounted at the other end 82 of cylinder 54 by spring pivot means 81. When flapper door 80 is in a closed position as seen in FIG. 4 with the lance 56 retracted within cylinder 54, an auxiliary steam chamber 84 is defined by the cylinder 54 and the door 80. The door 80 is easily movable to an open position which permits extension of the lance 56, the dotted outline of the door 80 is seen in the open position in FIG. 1. A wedge shaped gusset plate 83 is mounted on the lance 56 extending out from the lance above the plate 66, so that when the lance is retracted the flapper door 80 is guided over the plate 66 as the door 80 returns to the normally closed position. The flapper door 80 and auxiliary steam chamber 84 are particularly useful for maintaining the filling end 70 in a sterile condition when the filling apparatus 20 is raised to permit the filled drum to be moved and an empty drum brought into alignment with the filling head.

A drum capping means 86 is mounted from the top portion of the filling head 30 and is vertically movable toward the drum filling opening 16. A swageable closure cap 88 is supportable on the end thereof and the capping means 86 is operatively connected to vertical drive means 90 mounted on the exterior of the filling head. The capping means 86 includes means which apply a swaging force to the swagable closure cap 88 when the closure cap 88 has been lowered into the drum filling opening 16 to effect sealing of the drum.

The entire filling apparatus 20 is thereafter vertically moved upwardly and the drum 10 is conveyed out of position and a new empty drum is moved into position below the filling apparatus 20 and the cycle is repeated.

The present structural arrangement is particularly advantageous in that all the individual elements involve straight line longitudinal movements which are very easy to control. The condensate lance 48, the filling lance 56, and the capping means 86 are all movable in straight line fashion from retracted positions to an extensive position within or proximate the drum. The provision of a seal means which substantially segregates the drum atmosphere from the filling head chamber atmosphere during the filling operation minimizes condensation of steam within the drum, and permits maintenance of an above atmospheric pressure steam atmosphere in the filling head chamber at all times to prevent the drawing in of any airborn contaminates.

The apparatus can be readily varied using structural equivalents for various elements, thus the diaphragm seal or restriction means 74 can be a sufficiently rigid yet resilient rubberous member instead of the plate and gasket assembly which is shown and described above. The guide flange 41 is described as a continuous arcuate ring-like member, but can be a plurality of wedge-shaped segments which are accurately spaced about the flange 40 to perform the same function of guiding the drum into sealing engagement with the gasket 42.

We claim:

1. Apparatus for aseptically filling a shipping and storage drum with a flowable product wherein the drum has a top with a filling opening therein, which opening is adapted to receive a closure after the drum has been filled, said apparatus comprising:

a filling head engagable with the top of the drum including steam inlet means whereby sterilizing steam is admitted to maintain above atmospheric pressure in the filling head, said filling head including a flowable product filling lance which is extendible into the drum through the drum filling opening and retractable therefrom, the improvement wherein a diaphragm seal means is movable into engagement in the drum opening about the filling lance which extends through the drum opening during the filling operation, said seal means substantially restricts passage of steam from the filling head to the drum during the filling operation and permits maintenance of an above atmospheric pressure steam atmosphere in the filling head during the filling operation.

2. The apparatus specified in claim 1, wherein the diaphragm seal means is mounted about the filling lance in a plane generally parallel to the drum top and comprises a rigid plate with a sealing gasket disposed on the under side of the rigid plate, which sealing gasket seats on the rim of the drum filling opening.

3. The apparatus specified in claim 2, wherein the diaphragm seal means has a restrictive aperture therethrough to substantially restrict passage of steam from the filling head to the drum, yet permits displacement of steam or air from the drum as it is filled with liquid.

4. The apparatus specified in claim 1, wherein the filling head comprises a generally cylindrical body portion having an open bottom portion with an arcuate alignment flange extending downwardly from the cylindrical body portion, which alignment flange fits over the drum top rim and guides the drum into axial alignment with the filling head, and wherein a sealing gasket is associated with the arcuate alignment flange, which gasket seats on the drum rim to seal the filling head chamber and the drum from the ambient atmosphere.

5. The apparatus specified in claim 4, wherein the filling head is supported from a stationary frame by means of lifting and lowering means which are pivotally connected to the filling head to facilitate alignment of the filling head and drum as the filling head is lowered into engagement with the drum.

6. The apparatus specified in claim 1, wherein a condensate removal lance is included in the filling head and the condensate removal lance and the filling lance are each longitudinally movable along the direction of extension of the respective lance, with each respective lance passing sequentially through the drum filling opening upon extension of the lance.

7. The apparatus specified in claim 1, wherein drum capping means are mounted within the filling head for supporting a closure cap in the sterilizing steam atmosphere, which capping means is longitudinally movable after retraction of the condensate removal lance and the filling lance, from a retracted position proximate the top of the filling head chamber to a capping position with the closure cap fitted within the drum filling opening, and including means for forceably sealing the closure cap in the drum opening.

8. Apparatus for aseptically filling a shipping and storage drum with a flowable product wherein the drum has a top with a filling opening therein, which opening is adapted to receive a closure after the drum has been filled, said apparatus comprising:

a filling head engagable with the top of the drum when the filling head and the drum are axially aligned, with steam inlets through the filling head whereby sterilizing steam is admitted to the filling head and into the engaged drum through the filling opening in the drum top;

a condensate removal lance mounted through the filling head, which condensate removal lance is directed toward the filling opening in the aligned drum top, and which condensate removal lance is longitudinally movable along the direction of extension of the said condensate removal lance from a retracted position proximate the top of the filling head chamber to an operative position within the drum proximate the drum bottom;

a lance support cylinder mounted through the filling head;

a flowable product filling lance mounted in the lance cylinder, which filling lance is directed toward the filling opening in the aligned drum top and which filling lance is longitudinally movable along the direction of extension of the said filling lance, after the condensate removal lance is retracted, from a retracted position within the lance cylinder to a filling position within the drum;

a capping means mounted within the filling head for supporting a closure cap in the sterilizing steam atmosphere, which capping means is longitudinally movable after retraction of the condensate lance and the filling lance, from a retracted position proximate the top of the filling head chamber to a capping position with the closure cap fitted within the opening in the top of the drum, and including means for forceably sealing the closure cap in the drum opening.

9. The apparatus specified in claim 8, wherein a diaphragm seal means is mounted on the filling lance, which diaphragm seal means is generally horizontally disposed in a plane parallel with the top of the drum, which diaphragm seal means is movable with the filling lance when the filling lance is longitudinally moved into filling position, said diaphragm seal means seating about the opening in the top of the drum to effect a substantial restriction between the drum atmosphere and the filling head atmosphere so that as flowable product is filled into the drum, condensation within the drum is minimized.

10. The apparatus specified in claim 8, wherein the filling head comprises a generally cylindrical body portion having an open bottom portion with an arcuate alignment flange extending downwardly from the cylindrical body portion, which alignment flange fits over the drum top rim and guides the drum into axial alignment with the filling head.

11. The apparatus specified in claim 10, wherein the filling head is supported from a stationary frame by means of lifting and lowering means which are pivotally connected to the filling head, to facilitate alignment of the filling head and drum as the filling head is lowered into engagement with the drum.

12. The apparatus specified in claim 11, wherein a sealing gasket is associated with the arcuate alignment flange, with the rim of the drum top seating against this sealing gasket to seal the filling head chamber and the drum from the ambient atmosphere.

13. The apparatus specified in claim 8, wherein the filling lance is retractable through the support cylinder with the extending end portion of the lance being disposed within the cylinder when not in use, and a closure door is attached to the end of the cylinder support which is open for extension of the filling lance for drum filling, which closure door is closed defining a cylinder chamber when the lance is retracted therein, and steam inlet means are provided through the support cylinder for maintaining a sterilizing steam atmosphere within the cylinder chamber.

14. The apparatus specified in claim 8, wherein the lance support cylinder steam inlets are symmetrically positioned about the cylinder proximate the closed end thereof, so that as the filling lance is being extended the lance is subjected to encompassing jets of sterilizing steam.

15. The apparatus specified in claim 8, wherein a liquid sensing means is disposed from the diaphragm restriction means which seats about the drum filling opening, which liquid sensing means indicates that the drum is filled with the requisite quantity of liquid product.

16. The method of aseptically filling a drum with a flowable product utilizing a filling head which is engagable with the top of the drum, with a filling opening provided through the top of the drum which method comprises:

introducing sterilizing steam into the engaged filling head and drum to establish a sterilizing steam atmosphere which is above atmospheric pressure within the drum and within the filling head;

removing condensed steam from within the drum;

introducing a filling lance through the opening in the drum and restricting the opening about the lance while continuing to admit sterilizing steam into the filling head, and thereafter introducing flowable product into the drum, whereby the condensation of steam within the drum is minimized and a steam atmosphere which is above atmospheric pressure is maintained in the filling head.

17. The method specified in claim 16, wherein upon completion of filling of the drum a drum capping means integral with the filling head is activated to seal the drum with a cap while a steam atmosphere which is above atmospheric pressure is maintained in the filling head.

18. The method specified in claim 16, wherein the condensed steam is removed from the otherwise steam filled drum by a longitudinally extendible and retractable condensate removal lance which passes through the drum filling opening to the bottom of the drum when extended.

19. The method specified in claim 16, wherein the filling lance is longitudinally extendible and retractable, and extends through the drum filling opening when extended to permit filling of the drum.

20. The method specified in claim 16, wherein the drum filling opening is restricted during the lance filling of the drum, yet the restriction permits displacement of steam or air within the drum by the flowable product as the product fills the drum.

* * * * *